United States Patent [19]

Weinreich

[11] Patent Number: 4,621,443
[45] Date of Patent: Nov. 11, 1986

[54] DIGITAL SCREEN DISPLAY APPARATUS

[76] Inventor: Stephen Weinreich, 14 Norton Rd., Monmouth Junction, N.J. 08852

[21] Appl. No.: 630,832

[22] Filed: Jul. 13, 1984

[51] Int. Cl.⁴ .............................................. G09F 19/00
[52] U.S. Cl. ........................................ 40/436; 40/437
[58] Field of Search ................ 40/436, 437, 442, 451, 40/452, 476

[56] References Cited

U.S. PATENT DOCUMENTS

| | | | |
|---|---|---|---|
| 1,114,267 | 10/1914 | Jones | 40/452 |
| 1,172,360 | 2/1916 | Hildburgh | 40/437 |
| 2,432,896 | 12/1947 | Hotchner | 40/436 |
| 2,507,975 | 5/1950 | Hotchner | 40/436 |
| 2,956,359 | 10/1960 | Smith et al. | 40/442 |
| 3,159,936 | 12/1964 | Musaphia | 40/436 |
| 3,237,331 | 3/1966 | Gill, Jr. | 40/476 |
| 3,314,179 | 4/1957 | Leach | 40/437 |
| 3,329,475 | 7/1967 | Hasala | 352/81 |
| 3,629,965 | 12/1971 | Heindl, Jr. | 40/436 |
| 3,686,781 | 8/1972 | Calhoun, Jr. | 40/437 |
| 3,783,539 | 1/1974 | Trame | 40/452 |
| 3,918,185 | 11/1975 | Hasala | 40/436 |
| 3,987,558 | 10/1976 | Tsukamoto | 434/96 |

Primary Examiner—Robert Peshock
Assistant Examiner—Cary E. Stone
Attorney, Agent, or Firm—Richard C. Woodbridge

[57] ABSTRACT

A digitizing screen apparatus includes a front diffuser sheet, a grid and a back diffuser sheet which produces a unique digitizing effect. Images are projected from transparent slides onto the back diffuser sheet. A striped mask shields a portion of the back diffuser sheet from the light. Art work is placed on the slides and punched to provide a multiplicity of windows. When no image is shown all of the slides are located so that their windows line up behind the windows in the mask and the art work portions are lined up across from the nontransparent portions of the mask. A solenoid operated drive selectively presents one or more slides at a time to the transparent windows in the mask for projection upon the digitizing screen. A programming mechanism in combination with a damping dash pot associated with the solenoid drive permits one mosaic image to dissolve into another as the first slide is withdrawn and a second slide replaces it. According to one alternative embodiment the grid may be replaced by a simple spacing mechanism having a predetermined gap. According to another alternative embodiment, the drive means can comprise a bi-metallic drive device. The invention is capable of presenting a substantial number of mosaic images which dissolve from one to another in a pleasing manner.

30 Claims, 12 Drawing Figures

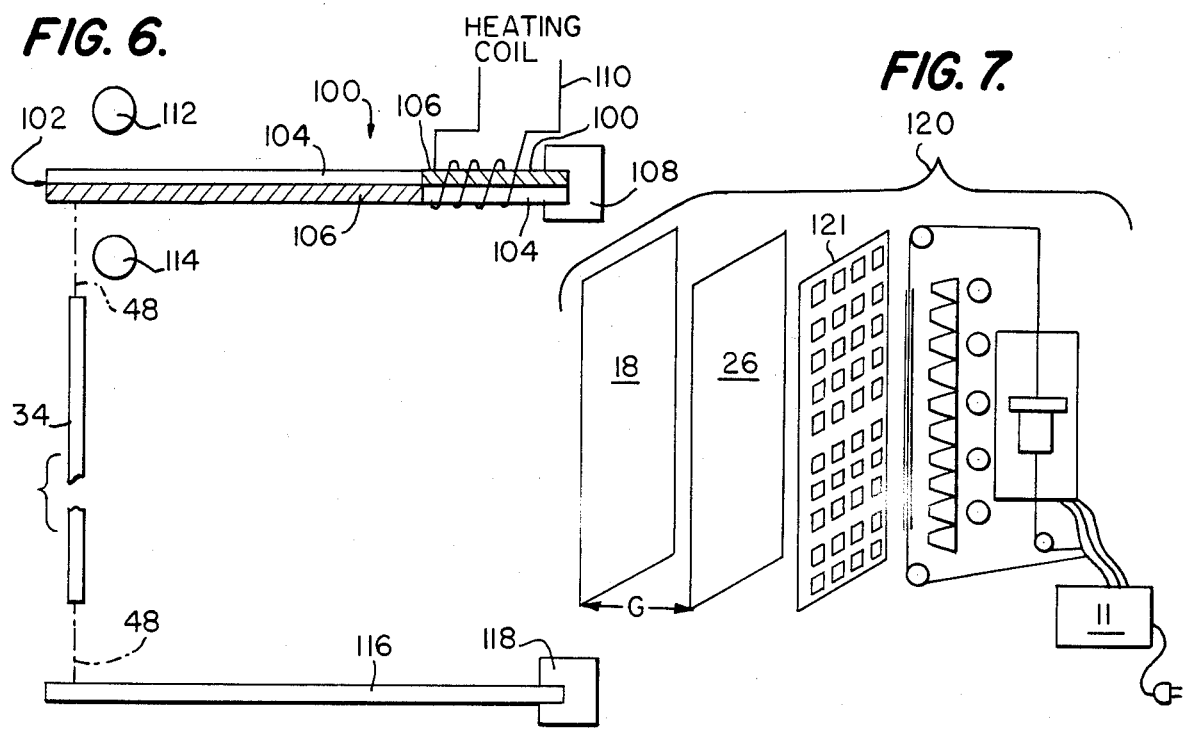

DIGITAL SCREEN DISPLAY APPARATUS

BACKGROUND OF THE INVENTION

1. Field of the Invention

The invention relates to a digitizing screen apparatus and a drive means for presenting projectable images to said digitizing screen.

2. Description of the Prior Art

The patent literature discloses several attempts to digitize images. One early technique was to drive a patterned back drop with respect to a plurality of small apertures. The pattern seen through the front apertures changes as the back drop is moved. Schemes such as the foregoing are described in U.S. Pat. Nos. 1,114,267 and 1,172,360, among others.

A more recent technique is to project an image onto a patterned screen. The pattern may take the form of quilting or other repeating features. U.S. Patent references discussing this type of technique include, but are not necessarily limited to, U.S. Pat. Nos. 3,423,896; 2,507,975 and 3,740,631.

Other U.S. patents of possible interest include U.S. Pat. Nos. 1,837,894; 3,335,457; 3,237,331; 3,314,179; 3,329,475; 3,568,346; 3,686,781; 3,783,539 and 3,987,558.

In addition to the foregoing, other efforts have been made to produce digital-like displays. For example, digitized signs can be found in places such as Times Square, New York City. According to one embodiment, a field of light bulbs is controlled by an array of photocells each actuating a single bulb on the display screen through an amplifier circuit. Movies of shadow graphs and in some cases real shadows are cast upon the screen from a control room behind the sign. The images projected on the photocells appear in lights on the display screen over the street.

Other, less costly efforts have been made to digitize images on a more modest scale. One device marketed under the name Channel 2000 incorporated a plurality of lenses. Another device known as Channel 1 used a single diffusing sheet and an egg crate separator. Both products were designed to be placed over TV screens to create amusing patterns.

SUMMARY OF THE INVENTION

Briefly described the invention comprises a digital screen display apparatus for digitizing one or more images selectively presented on partially transparent slides by a solenoid operated drive means. The digitizing screen preferably comprises a front diffuser sheet and a back diffuser sheet separated by a grid. The grid includes a plurality of normally square apertures having sides formed in compound parabolic shapes to concentrate light on the front diffuser sheet. Art work is stored on transparent slides. The apparatus may include one or more slides, depending upon the nature of the effect to be achieved. A striped mask having alternate transparent and opaque zones is located between the back diffuser sheet and the art work slides. The art work on the slides is punched to provide windows. When no image is projected, all of the slides are arranged such that their windows line up with the transparent zones of the mask so that light passes through the slides and the mask virtually unimpeded. In order to present an image, one of the slides is moved with respect to the screen assembly so as to position the art work in the path between the illumination source and the window in the mask so as to project a digitized or mosaic image on the front diffuser sheet. The back diffuser sheet serves the important purpose of homogenizing the image presented to the front diffuser sheet. Therefore, the front diffuser sheet exhibits a uniform color with no noticeable gradations across the square face of each cell.

Each slide includes an upper and lower tab attached to a drive ribbon. The ribbon passes through a plurality of pulleys and is connected to one arm of a "T"-shaped lever or crank. A solenoid, a dash pot and a return spring are connected to the other arms of the "T"-shaped crank. Actuation of the solenoid causes the crank to drive the ribbon and, therefore, the slide. Each art work slide is associated with its own independent solenoid and crank drive mechanism. A conventional programming device can be employed to control the sequencing of the slides and therefore the presentation of the art work to the digitizing screen.

According to one alternative embodiment of the invention the two diffuser sheets can be separated by a spacing means comprising a gap having a predetermined spacing. According to another alternative embodiment of the invention the drive means could comprise a bi-metallic drive apparatus. The slides can also be moved by a chain driven cam which sequentially moves the drive ribbons of the slides. A single slide embodiment is also presented in which a plurality of digitized images is produced using only one artwork slide.

These and other features of the present invention will be more fully appreciated by reference to the following drawings.

BRIEF DESCRIPTION OF THE DRAWINGS

FIG. 6 is a schematic side elevational view of an alternative embodiment of the invention in which the slides are driven by bi-metallic strips.

FIG. 7 is a schematic exploded view of another alternative embodiment of the invention in which the digitizing grid has been removed and replaced by a gap G.

FIG. 8A is a side elevational exploded view of the single slide alternative embodiment of the invention.

FIG. 8B is an exploded view of the single slide alternative embodiment of the invention illustrated in FIG. 8A.

DETAILED DESCRIPTION OF THE INVENTION

During the course of this description like numbers will be used to indicate like elements according to the different figures which illustrate the invention.

Figure 1:
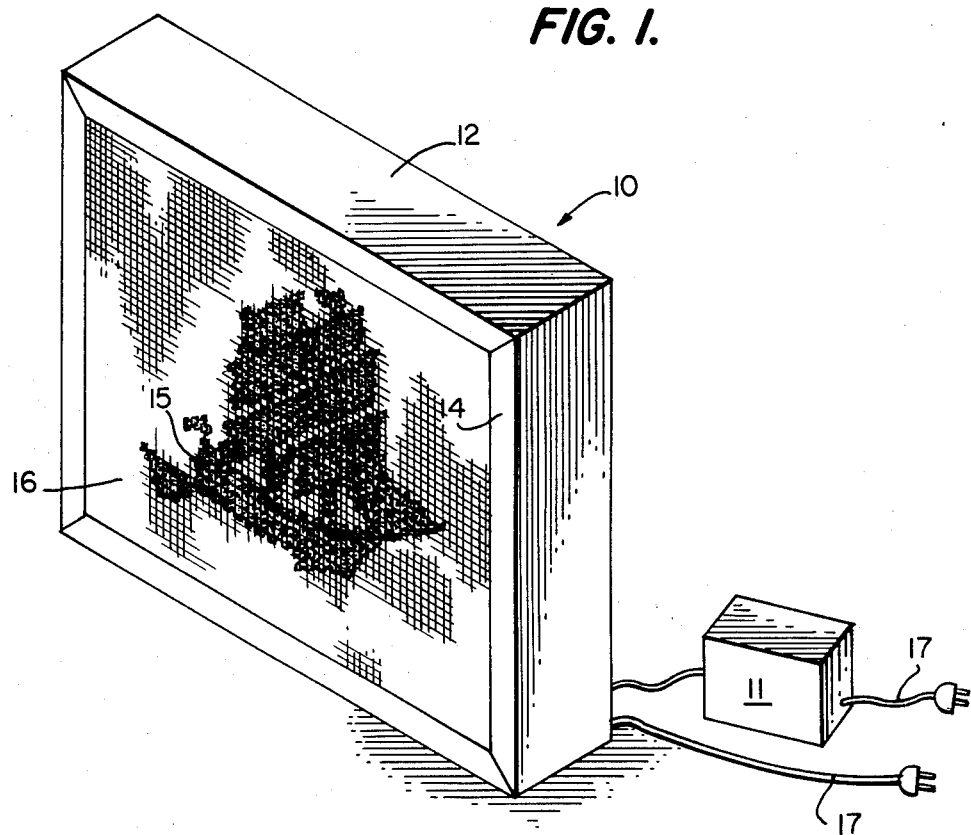
FIG. 1 is a front perspective view of the preferred embodiment of the digital screen invention.

The invention 10, according to the preferred embodiment of the invention is illustrated in FIGS. 1 through 5. The exterior of the invention 10, as shown in FIG. 1, includes a housing 12 which includes frame 14. Frame 14 surrounds a digitizing screen 16. An image 15 is shown on screen 16 in FIG. 1. The image 15 will change from time to time as controlled by the mechanism illustrated in further detail in FIGS. 2-5. Each image 15 is comprised of a series of crisp, clear squares. As the images 15 change they dissolve in a pleasing fashion from one to another as controlled by a conventional programming means 11. Power for the device 10 and programming means 11 are supplied through AC plug 17.

The digital screen 16 is actually a sandwich including a front diffuser sheet 18 and a back diffuser sheet 26 separated by a grid 20. Grid 20 is similar to those found in fluorescent electrical lighting fixtures. Each grid 20 includes a plurality of square grid openings or apertures 22 arranged in vertical and horizontal rows. The sidewall 24 of each grid aperture 22 have a compound parabolic shape which helps to concentrate the light onto the front diffuser sheet 18. A mask 28 is located directly behind the rear diffuser sheet 26. Mask 28 includes alternate rows of dark stripes 32 separated by transparent stripes 30. The dark stripes 32 are located directly behind the grid sidewalls 24 so as to present the transparent rows 30 to the apertures 22 of grid 20.

A critical part of the present invention 10 is the use of a back diffuser 26 in conjunction with a front diffuser 18 and a grid 20. The rear diffuser 26 serves the critical purpose of homogenizing the image 15 that is presented by the front diffuser 18. The homogenizing effect of the back diffuser 26 causes each digitized square visible on the front diffuser 18 to assume a uniform, continuous color. This characteristic is a substantial improvement over prior art digitizing systems.

Art work 35 is preferably printed on transparent slides 34. Perforations 96 are arranged in rows and located to match the mask openings 30 horizontally and the grid apertures 22 both horizontally and vertically. This structure minimizes light attenuation but requires the presence of a thin Mylar ® slip sheet 98 attached to each of the slides 34 to avoid interference between the slides 34. Alternatively, the slide 34 would be a continuous solid structure with transparent stripes alternating between rows of art work. Mask 28 stays stationary with respect to back diffuser sheet 26 whereas the slides 34 are movable with respect to the back diffuser sheet 26. A transparent retaining plate 36 is located behind slides 34 and serves to keep the slides relatively flat and in position with respect to mask 28. A plurality of cone concentrators 38 are located between the fluorescent light source 40 and the retaining plate 36. Cone concentrators 38 focus the light from fluorescent source 40 down to the size of and in line with the transparent areas 30 on mask 28. The light travels from fluorescent source 40, through cone concentrators 38, transparent retaining plate 36, slides 34 with their slip sheets, openings 30 in mask 28, back diffuser sheet 26, grid openings 22 and finally through front diffuser sheet 18. Cone concentrators 38 can be molded from plastic and metalized with a mirror finish. There are typically six fluorescent lights 40 mounted on fixture brackets 42 located near the back of housing 12. Columns 43 connect top pulley brackets to bottom pulley drive brackets.

The device thus far described would produce a plurality of white squares approximately ⅜″ on each side if no art work 35 were lined up behind mask openings 30. The presentation of slide art work 35 to the mask windows 30 is controlled by drive unit 41. Drive unit 41 essentially comprises solenoid 80, "T"-shaped crank 56, air pot 76, return spring 84 and slide drive ribbon 48. Each slide 34 includes an upper and a lower slide tab 44 and 46 respectively. Slide tabs 44 and 46 are vertically aligned with each other and are attached to opposite ends of slide drive ribbon 48. Slides 34 are divided into an upper group 31 and a lower group 33. Each upper slide 31 is separated from the next upper slide 31 by a lower slide 33. When not used for viewing purposes the slides 34 always return to their respective upper and lower positions 31 and 33 under the influence of return spring 84. The purpose of dividing the slides into an upper group 31 and a lower group 33 is to assist in the production of a gradual dissolving effect in a manner to be described later. Upper slide tab 44 passes over the first of a pair of upper pulleys 50 and is then connected to the slide control ribbon 48 which passes over the second of a pair of upper pulleys 50 and over a first lower pulley 54 and then is connected to the bottom or third arm 72 of "T"-shaped crank 56. A counterweight 52 attached to ribbon 48 counter balances the weight of the slide 34. Ribbon 48 is attached to "T"-shaped crank 56 by running it through a series of attachment pins 58 which frictionally engage the ribbon 48. Ribbon 48 proceeds from crank 56 over a second lower pulley 60 to a tension spring 62 which is in turn attached to the lower slide tab 46. The lower slide tab 46 then passes over a third lower pulley 64. The take up spring 62 serves to take the slack out of the ribbon 48 and to hold the slide square thus allowing a single line of pull. Therefore ribbon 48 and slide 34 and spring 62 form a continuous loop through the drive unit 41. The actuating members of the drive unit 41 are mounted between plates 66 "T"-shaped crank 56 is rotatably attached between plates 66 by pivot bearing 74 which is located in the middle of crank 56 at the intersection of the first arm 68, the second arm 70 and the third arm 72 and rotates on shaft 75. Air pot 76, solenoid 80 and return spring 84 are mounted to shelves 67 which are in turn mounted between plates 66. Attachment rod 78 connects the first, or right arm 68 of "T"-shaped crank 56 to air pot 76. Likewise, plunger 82 of solenoid 80 is connected to the second or left arm 70 of "T"-shaped lever 56. Return spring 84 is normally attached to the first arm 68 of crank 56 and mounted on the side opposite from air pot 76.

Each slide 34 has its own drive unit 41. The alternate row of adjacent solenoids 86 return spring 87 and air pots 88 are shown in phantom in FIG. 2. Alternate row solenoids 86, return springs 87 and air pots 88 of adjacent drive units 90 are inverted with respect to the solenoids 80 and dash pots 76 of drive units 41. Adjacent drive units 90 are connected to the alternate upper and lower row of slide tabs 92 and 94 associated with the upper (or pull down) group of slides 31. Solenoids 80 and 86 are the type that are normally withdrawn when actuated, then the following associations of elements takes place. Each drive unit 41 is associated with a slide 34 in the lower slide group 33. Actuation of solenoid 80 causes crank 56 on bearing 74 to pivot around shaft 75 in such a fashion as to draw the slide 34 in the lower group 33 upward and into position with art work 35 lined up directly behind mask window 30 in mask 28. Similarly the alternate row drive units 90 will propel a slide 34 from the upper group 31 into viewing position. This happens when alternate row solenoid 86 is actuated causing ribbon 48 to pull down on a slide 34 from the upper set 31 thereby bringing its art work 35 into position behind the window opening 30 in mask 28. Alternate staggering of the solenoids 80 and 86 and the dash pots 76 and 88 make it possible to compact the drive units 41 and 90. The perforations 96 in slides 34 serve to let light through. Clear Mylar ® separators 98 are normally situated between adjacent slides 34 so as to keep the slides 34 from catching on one another.

The drive units 41 and 90 are controllable by conventional programmers 11. Such programming devices 11 can include, but are not necessarily limited to, the following conventional devices: stepper relays; cam timers; rotary switches; pushbuttons; punched tape programs and electronic programmers. The digitizing screen apparatus 10 of the preferred embodiment may be plugged into a dedicated programmer 11 or into a master programmer which controls an entire exhibit or other equipment.

For compactness, economy and efficient operation, the slides 34 in the multi-slide system 10 are formed from thin sheets of plastic film. The basic requirement is that the film 34 be stiff because wrinkling would be disastrous. An additional advantage of using plastic film is that photographic transparency films of sufficient weight may be used directly as slides without requiring additional material or mounting. In order to keep these thin sheets under control an additional plastic panel of Lucite ® or Lexan ® or Plexiglass ® or glass 98 is placed behind the stack of slides but in front of the light source 40 and cone concentrators 38. According to the preferred embodiment 10 the light source is a plurality of fluorescent lamps 40. The mounting plates 66 are mounted vertically in order to leave a central space for the drive systems 41 and 90. The specific advantages of fluorescent lights are whiteness, coolness and relatively low wattage and large source area characteristics. Even though fluorescent light is preferred, other light sources are possible. General illumination sources which would be acceptable include the fluorescent source mentioned previously, incandescent sources, halogen sources, mercury vapor and, under appropriate circumstances, the sun. In most cases, reflectors can be helpful. Generally greater apparent brightness can be obtained by shading the digital screen face 16 from ambient light.

Figure 4:
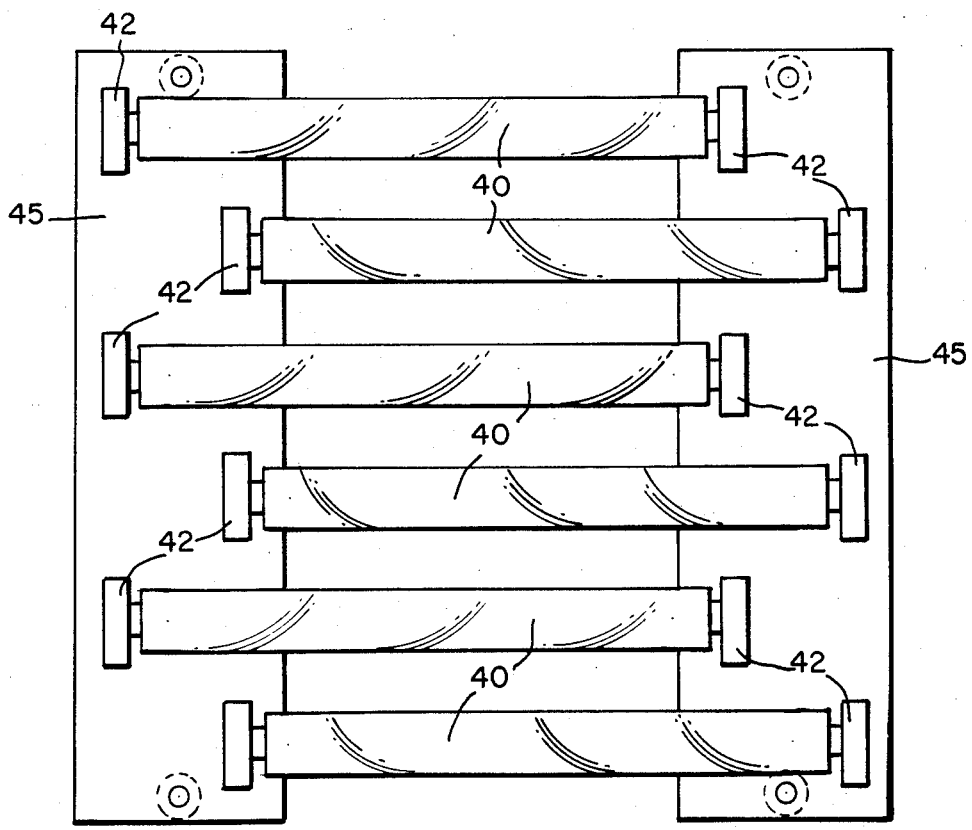
FIG. 4 is a front elevational view of the mounting plates and fluorescent back lighting used in the preferred embodiment of FIG. 1.
Figure 2:
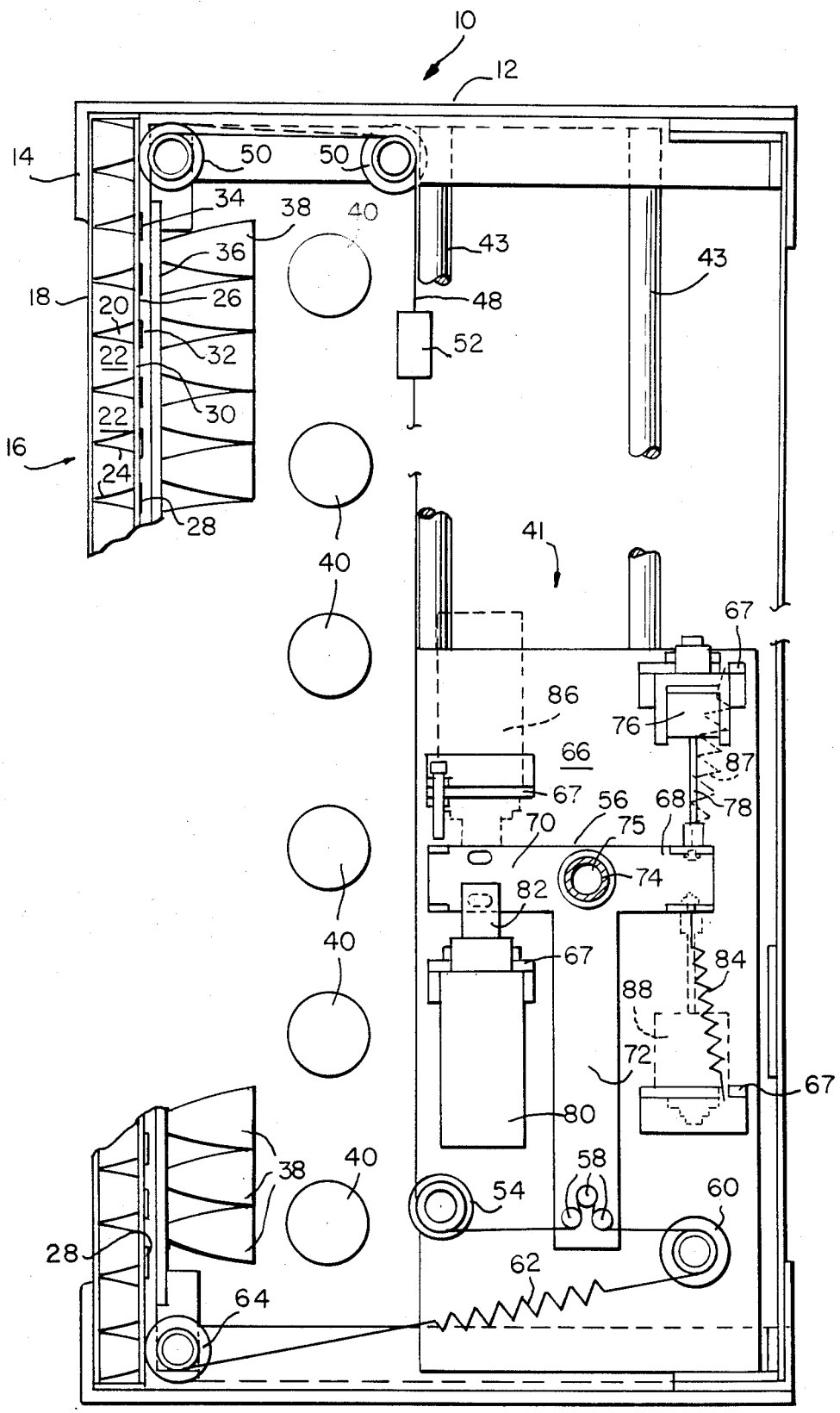
FIG. 2 is a side cross-sectional view of the preferred embodiment of the invention illustrated in FIG. 1.
Figure 3:
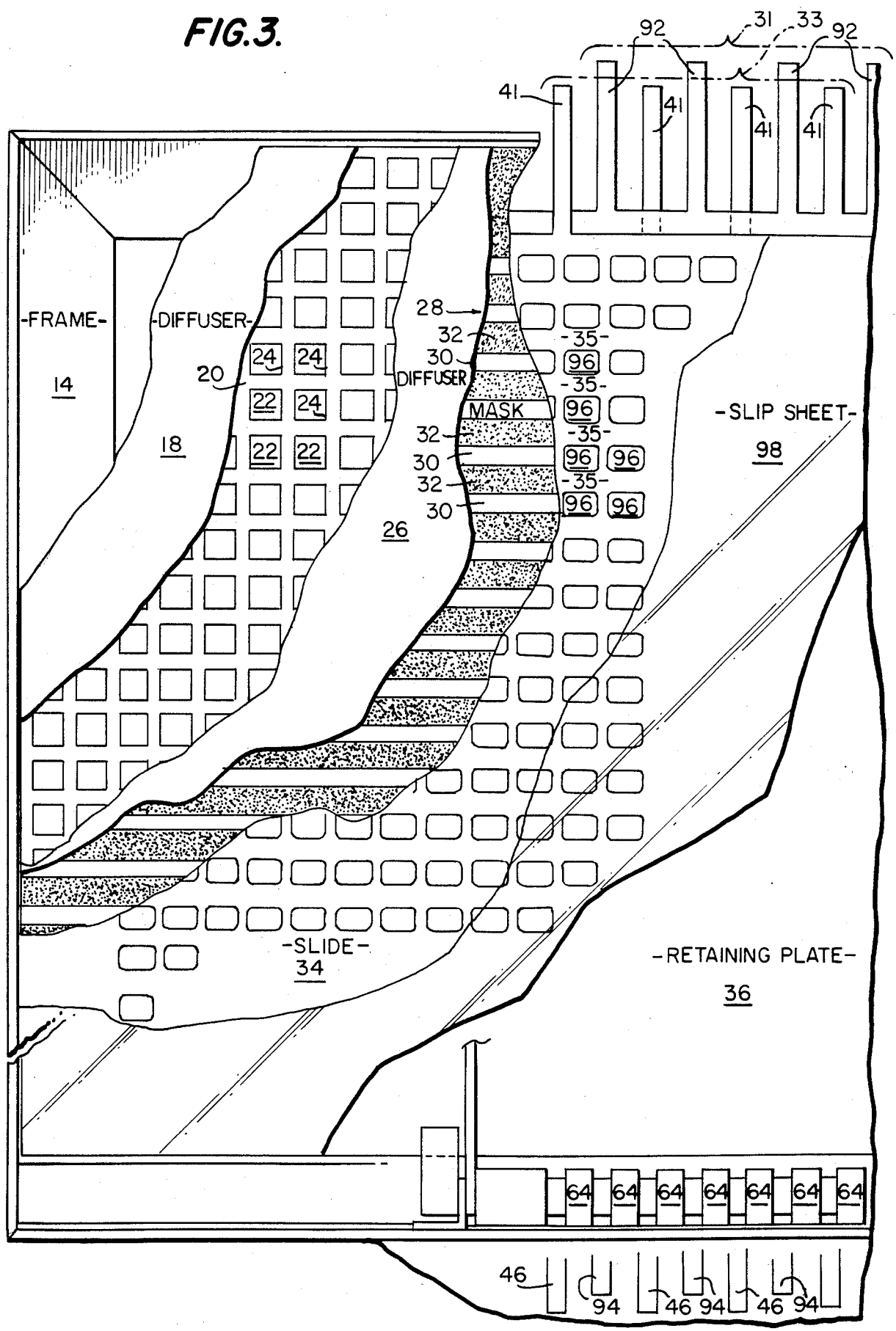
FIG. 3 is a back elevational view of the invention illustrated in FIG. 1 with the screen partially broken away.
Figure 5:
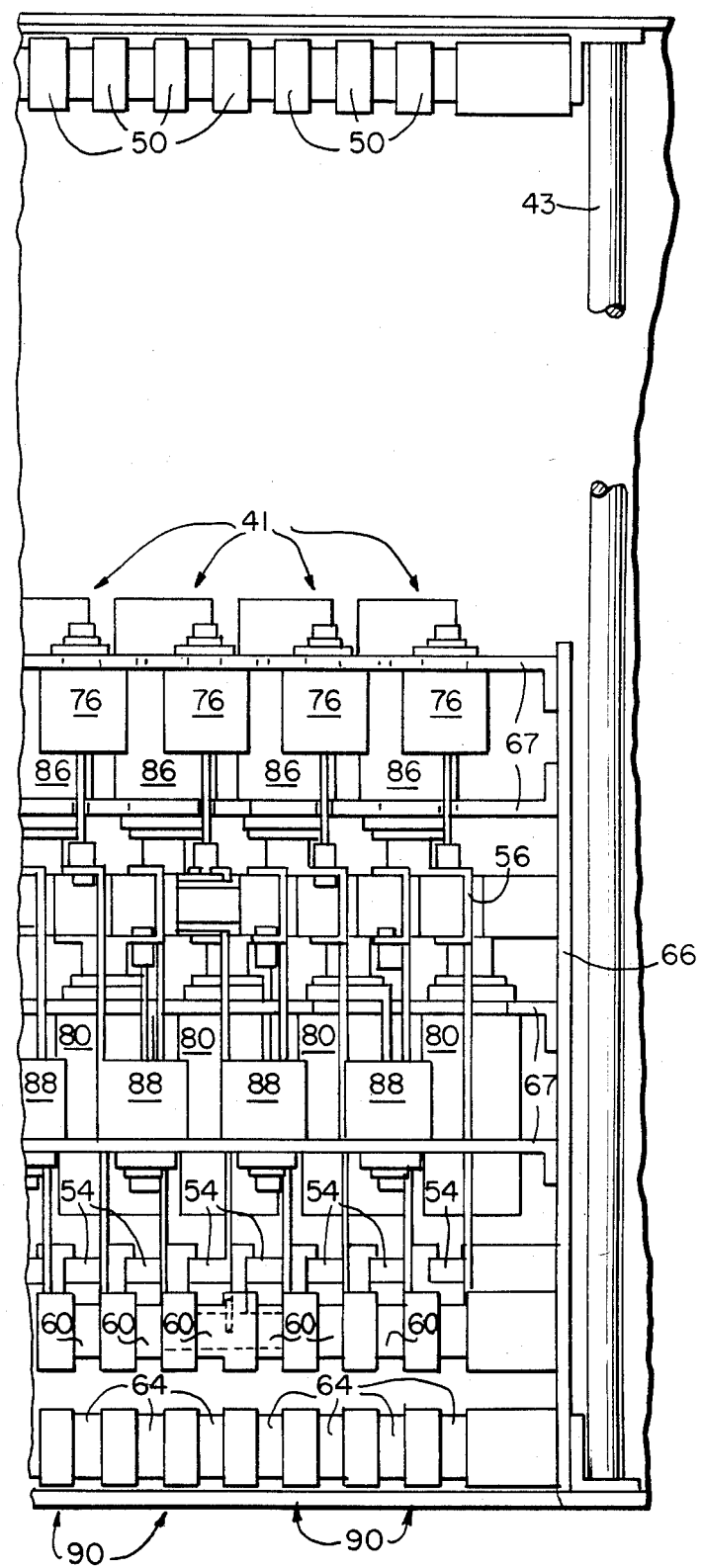
FIG. 5 is a rear internal elevational view of the preferred embodiment of FIG. 1.

FIG. 4 illustrates the manner in which the fluorescent light tubes 40 are mounted. Each of the approximately six fluorescent tubes 40 are supported by standard sockets 42 attached to left and right mounting plates 45. Left and right mounting plates 45 both lie in the same plane, are oriented vertically, and are rigidly attached to the inside of a rear frame within housing 12. The rear frame also carries the top and bottom mounting brackets to allow removal of the entire operating system for service and adjustment. Fluorescent tubes 40 are mounted horizontally and parallel to the dark striped areas 32 on mask 28. Each fluorescent tube 40 is staggered with respect to its adjacent neighbor so as to more evenly distribute the back lighting behind the slides 34.

Lenses over concentrators, such as cone concentrators 38 can be used to concentrate the general illumination into the mask windows 30. The series of horizontal linear compound parabolic concentrators 38 may in some configurations take the place of plastic retaining plate 36 behind the slides 34. The concentrators, alternatively, could be a series of horizontal linear compound eliptical concentrators or flat mirror sections or other means. The choice of concentrators or lenses is also a function of cost.

The preferred digital screen embodiment 10 is characterized by high efficiency of illumination, good storage capacity, mechanical simplicity and its suitability for a wide variety of control configurations. Mask apertures or windows 30 are fully as wide horizontally as the grid openings 22 connecting to form open bands across the digital screen 16. The width of the dark bands 32 is just greater than ½ times the cell dimension. The typical cell width is approximately equal to the cell depth which is about ⅝" in the preferred embodiment 10. The center line of a dark band 32 is located directly behind the walls of the cells that it crosses.

A series of slides 34 is made with one image of art work 35 on each slide, punched to provide a window for each cell position. In the storage or rest position the windows 96 of the superimposed slides 34 all coincide with the mask windows 30. A slide 34 taken from either the upper group 31 or the lower group 33 is drawn down or up a half cell dimension to bring the image art work elements 35 into coincidence with the mask windows 30 and the punched windows 96 of the other stored slides 34.

The digital screen sandwich 16 has a front diffuser sheet 18 and a back diffuser sheet 26 formed from 1/16" opal or milk white acrylic. The front and back diffusers 18 and 26 are separated by mirrored parabolic grid 20. The mirrored parabolic grid 20 is particularly effective in assisting in both homogenizing the light and creating relatively high brightness on the front face 18.

In order to assure a crisp appearance in digital screens 10 over a certain size, the front face 18 is held firmly against the grid 20 either by bonding or by first preforming the front diffuser 18. A slight spherical concavity will cause all parts of the front diffuser 18 to contact the grid 20 as the outer edges are drawn together.

In order to minimize friction and simplify design, the driving force applied to the slides 34 should be parallel to the plane of the screen 16. Accordingly, the pulleys 50 are stepped in diameter. Also, the slides 34 of the preferred embodiment 10, are sheared to form pull tabs 44, and 94 at their leading edges, each tab being offset horizontally from the others. A tab 46 and 92 for the return pull to storage is always formed at the trailing edge directly opposite the leading edge tab. Therefore, upper slide tabs 92 are located directly opposite lower slide tabs 94 and upper slide tabs 44 are located directly above lower slide tabs 46. The slide 34 may thus be kept in tension and thereby under control at all times without distortion or cocking. For simplicity, and economy each slide 34 only has one pull tab and one return tab.

It is possible to drive the system using a spring load on one side.

According to the preferred embodiment 10 the non-stretchable drive ribbon 48 bends around nylon rollers or bushings 50, 54, 60 and 64 placed between washers on small shafts. Tension spring 62 takes up the slack in the ribbon 48 and keeps the slide 34 under control. For larger units a balance weight 52 is added in the upper portion of the ribbon 48.

In order to maintain consistent light levels during slide changes, half the slides are stored above the viewing position and half are stored below. Drawing them alternately into viewing position prevents unpleasant swings in the character and illumination level of the image. Also, the most efficient packing of drive elements is obtained when the up and down slides alternate. With the continuous ribbon system, the drives for both directions of motion 41 and 90 can be in a single unit so that there is no need for wiring between the top and the bottom of the device 10. The continuous ribbon system also has the advantage of keeping the slides 34 under control by maintaining tension while minimizing the required drive force.

According to the preferred embodiment 10, solenoids 80 and 86 are used to pull the ribbons 48. Each solenoid has an associated air cylinder or dash pot 76 or 88. Each solenoid is operated by direct current and is rated for continuous duty. Proper adjustment of the dash pot 76 or 88 not only provides shock absorption to acceptable noise limits, but can also retard the solenoids motion. Thus an image may be introduced at almost any desired speed. It is preferred to alternately follow an upper slide with a lower slide in order to produce an acceptable "dissolve" from one image into the other. If an upper slide were to follow an upper slide, or a lower slide were to follow a lower slide, the result would be overlap of art work as well as image dilution by white light during the transition period resulting in an unacceptable image during the "dissolve".

An alternative embodiment of the invention 100 is illustrated in FIG. 6. A bi-metallic drive element 102 is fastened to the upper part of slide 34 by ribbon 48. The lower portion of slide 34 is attached by ribbon 48 to a metal spring 116 connected by a mounting block 118 to the housing of the alternative embodiment 100. Bi-metallic drive element 102 is formed from a lamination of a first metal 104 and a second metal 106. The lamination begins with the first metal 104 above the second metal 106. Part way through the lamination the metals are reversed so that the second metal 106 is located on the top and the first metal 104 is located on the bottom. The reversal weld is intended to provide for ambient temperature compensation. Bi-metallic drive element 102 is supported by mounting means 108 connected to the housing of the alternative embodiment 100. A heating coil 110 is employed to heat one section of the bi-metallic drive element 102 thereby causing the free, unmounted end to move up or down in response to the application of heat. The upward and downward movement of the free end of bi-metallic drive element 102 causes the slide 34 to move up and down as restrained by metal spring 116. The upward movement of drive element 102 is controlled by the hot stop 112. Likewise, the downward, or return motion of bi-metallic drive element 102 is controlled by the cold stop 114.

The operation of alternative embodiment 100 is as follows. The application of electricity to heating coil 110 causes the bi-metallic strip 102 to curve upward due to the difference in the thermal expansion characteristics of first metal 104 with respect to the second metal 106. The upward movement of the heated bi-metallic element 102 is controlled by the upper hot stop limit 112. Upward motion of bi-metallic drive element 102 causes the slide 34 to rise against the resistance of spring 116. When electrical energy stops flowing through heating coil 110 the bi-metallic drive element 102 cools coming to rest against the downward, cold stop limit 114. This causes slide 34 to return to its original position. A plurality of bi-metallic drive elements 102 can be used to drive a plurality of independently supported slides 34. While an individual heating coil 110 is illustrated in FIG. 6, it would also be possible to use resistance, self heating elements to achieve the same result. The economical alternative embodiment 100 can produce a smooth motion and, since there are few moving parts, would have a significantly long useful life. A bi-metal strip could also drive the preferred embodiment 10 as shown in FIGS. 1-5 in place of the solenoids and dash pots.

FIG. 7 illustrates a gridless embodiment 120 substantially identical to the embodiment illustrated in FIGS. 1 through 5 with the exception that the grid 20 is deleted and replaced by a gap "G" between the front diffuser element 18 and the rear diffuser element 26. A mask 121 is disposed between the rear diffuser 26 and an image forming system similar to that previously described with reference to the preferred embodiment in FIGS. 1 through 5. The digitizing effect of alternative embodiment 120 is not as pronounced as in embodiments 10 or 100, however, the effect can be useful for certain applications. Without grid 20 the projected image is blurred and less well defined. Embodiment 120 is especially useful when combined with the slide drive mechanisms illustrated in the other figures.

A single slide alternative embodiment 122 of the present invention is illustrated in FIGS. 8A and 8B. Like embodiment 10, the alternative embodiment 122 includes a front diffuser panel 18, a grid 20, a rear diffuser panel 26, a set of cone concentrators 38 and a source of fluorescent illumination 40. A mask 124 and an art work slide 126 are located between the rear diffuser 26 and the concentrator cones 128. A plurality of small round holes 125 are located at regular intervals across the face of mask 124. The holes 125 are quite small in combined area when compared to the total surface area of mask 124. For example, the total opening area of holes 125 might be substantially less than 10% of the total surface area of mask 124. Art work slide 126 includes a plurality of art work elements 128 on its surface. Translation motors 129 and 127 automatically drive slide 126 in the "Y" and the "X" directions respectively. A pair of cams 123 which drive slide 126 are connected to "X" drive motor 127 and "Y" drive motor 129. Frames and guides would typically support and guide slide 126 while it moves. Also, slide 126 and its associated art work 128 can be driven in a small circular path between mask 124 and light concentration cones 38 with a drive means consisting of a motor driving two or more cranks supporting the slide.

Embodiment 122 is referred to as the single slide embodiment or method. It requires that the aperture for each cell be at least slightly smaller than that portion of the cell represented by the reciprocal of the number of images. Each single transparency slide 126 (of the same general size as slide 34 of embodiment 10) is created containing an array of art work elements 128 such that all parts of the first image fall simultaneously into coincidence with the apertures 125 and, as the slide is moved, all parts of the second image fall simultaneously into coincidence with the mask and so on. Each image segment should be slightly larger than the aperture 125 in order to assure a clean image and, for most purposes, the segments of successive images should abut each other.

In some designs with concentrations and particularly in such single slide designs the mask may be eliminated if the concentrators form precise areas of illumination. An alternative configuration in which the array of cone concentrators is translated across the face of the slide has the added advantage of obviating the need to move the thin slide material. The homogenizing effect of the invention allows the lighted spot to occur at any point on the back diffusing sheet while still producing uniform illumination on the front surface of each cell. The most effective illumination for a single slide is achieved with a pattern of successive stripes, each aperture being a slit across the cell but this would require a different drive system such as a cam on a motor shaft to translate only in the vertical axis. This requires, however, that the sequence be reversed or the light source be temporarily extinguished in order to repeat the sequence. The slide motion is to translate a full cell dimension in the direction of the short aperture dimension (until half the images have been seen), then to translate perpendicularly one half cell dimension and return. Any of the foregoing configurations can carry more images than would otherwise be possible by making one of the images a clear window and superimposing additional identical slides with other art work (or image) elements.

There are also possible several other single slide systems in which the mask is an active element in the selection of the image.

According to one embodiment the mask could be a liquid crystal array, made so that there is a segment covering each image element for each cell. Generally the arrangement is such that all segments covering elements of each image are simultaneously made transparent, each image being revealed in turn. The other active system mask would be a polarized array so that a rotating polarizer causes light to pass through each set of image elements in turn.

The drive system for embodiment 122 is shown schematically as comprising an X and a Y translation motor 127 and 129 respectively. Another simple form of drive for a single slide embodiment 122 could comprise a pair of commonly driven cranks, each with a radius less than one cell dimension. The actual radius would be derived as a function of the aperture 125 size and the number of images involved. If only single axis translation is required, the slide 126 may be cam or crank driven. Two axis translation can be accomplished by commonly driven or synchronized cams, with the secondary axis drive mounted to a frame driven by the primary axis drive.

Figure 9A:
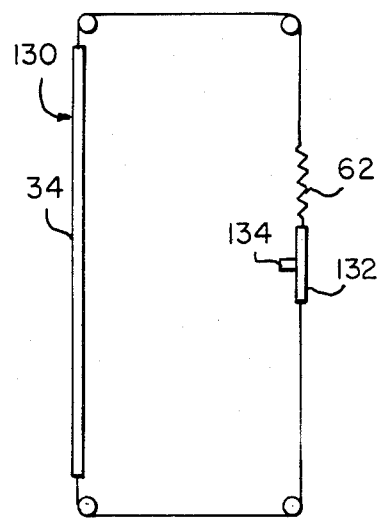
FIG. 9A illustrates an alternative cam operated drive mechanism.
Figure 9B:
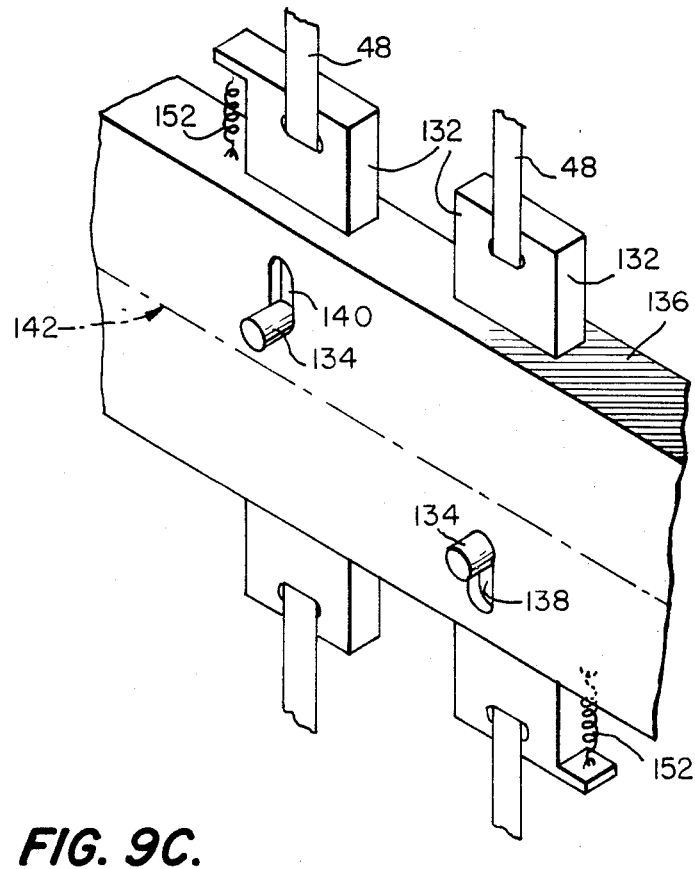
FIG. 9B is a detail of the embodiment of FIG. 9A showing the location of the cam path with respect to the cammable studs on the driving slides.
Figure 9C:
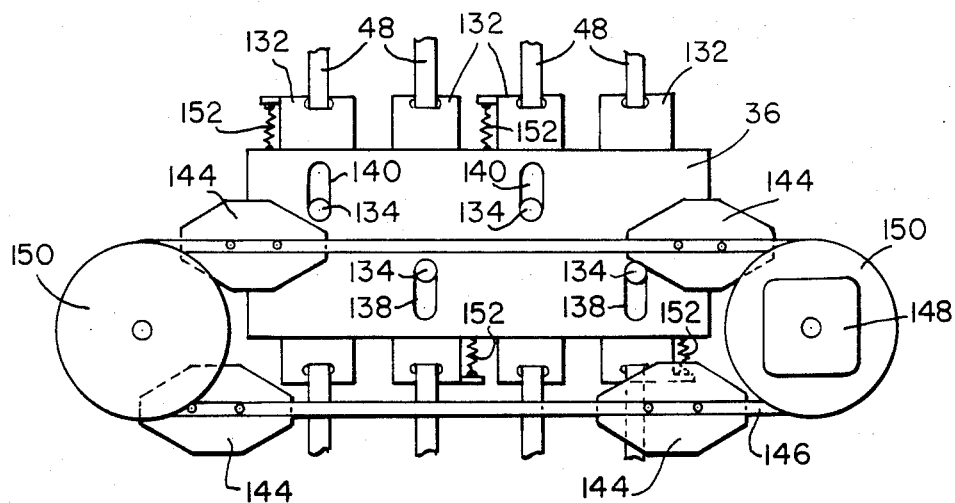
FIG. 9C illustrates the mechanism for driving a cam along the cam path to affect actuation of the alternative embodiment of the drive mechanism shown in FIGS. 9A and 9B.

An alternative chain drive embodiment 130 is illustrated in FIGS. 9A through 9C. Each slide 34 is driven by driving slide 132. Each driving slide 132 includes a cammable stud 134. A plurality of driving slides 132 are mounted in a horizontal block 136 so that they can slide up and down in the vertical direction by a limited amount. Each stud 134 extends through either a lower slot 138 or an upper slide 140. A lower slot 138 is located between every upper slot 140 so that the upper and lower slots alternate above and below a cam path line 142.

Cam path line 142 is the path taken by a diamond shaped cam 144 as it travels down the length of mounting block 136. Typically three or more diamond shaped cams 144 are mounted on a chain 146 and driven at one end by drive motor 148 with sprocket 150 and supported at the other end by idler sprocket 150. The diamond shaped cams 144 are mounted on the side of guide chain 146 so that they do not interfere with sprockets 150 as they make their respective turns. The movement of diamond shaped cam 144 causes each stud 134 to move up the leading edge of the diamond shaped cam 144 until it comes to the top at which point it returns down the trailing edge to its normal at rest position. Return springs 152 are employed to bring the slides 132 back to their original, non-driven position. As the diamond shaped cam 144 travels down path 142 it will first move a stud 134 up most of the length of an upper slot 140. As stud 134 reaches its apex the diamond shaped cam 144 contacts a stud 134 associated with a lower slot 138. The sequence continues alternately driving one stud 134 upward in an upper slot 140 and the next stud 134 downward in a lower slot 138 until the diamond shaped cam 144 comes to the end of the mounting block 136. At that point the second diamond shaped cam 144 comes into position to start the sequence all over again. This particular embodiment is useful for drive systems in which the sequence is continuously repeated. Embodiment 130 is also relatively inexpensive. However, it does not have the flexibility of embodiment 10 which allows for selective driving of the slides 34 and the selection of slide combinations.

It is possible that the invention may be supplied with blank slides 34 upon which prepared films may be applied. The techniques described below may be used to prepare those films as well as for putting art work directly on the slide. According to one general technique the windows are punched out of the slide. The wide backs of the ribs of the parabolic grid 20 allow the material left between the windows to be structurally significant without covering any useful part of the grid apertures 22. A brightness advantage is created since no material is clearer than any material. The great advantage of punching, however, is that no prior provision for windows need be made.

In order to avoid interference of punched slides and, in general, to protect art work from abrasion, a thin film or slip sheet should be applied over the colored face of each slide 34. Colored gels may be mounted directly to the slide with glue or tape. The art work may be photographically reproduced on transparency film. A mask can be prepared to either over expose or cover the window stripes depending upon whether the film is negative or positive. Screen printing with transparent ink is a particularly economical technique for duplicate slides. Window stripes can be masked out during printing or, better, left out of the screen. Transparent markers can be used to draw slides. The window stripes can be masked out or avoided during drawing. Of course, art work can be traced with transparent markers. Slides can also be drawn with transparent markers on a computer driven plotter. The art work can originate in the computer or it can be scanned for input to the computer.

Images to be digitized can be presented to the back surface of the digitizing screen in a variety of different ways for different applications. Some of the possible alternative inputs to the digital screen are: shadows from a white light source; shadows from several white light sources; shadows from a colored or changing color light source; colored shadows from several colored or changing color light sources; slide projections; movie projections; opaque projections, real time imaging wherein a lens projects a scene onto the screen as it is occurring; TV projections; fiberoptic image generation employing a variety of ways of illuminating and programming the fiberoptics; light emitting diodes, in one per cell and electronically controlled; light emitting diodes comprising several colored diodes per cell each electronically controlled; liquid crystal arrays employing one segment per cell which is back lit and electronically controlled; liquid crystal arrays employing several segments per cell which are back lit employing a color filter for each segment and electronically controlled; a back lit transparency in contact with a screen; a moving transparency or belt in contact with a screen and back lit; other transparency techniques known in the prior art, etc.

The present invention, according to its preferred embodiment 10, is capable of a variety of interesting techniques and effects. Some of those include:

1. Programming capabilities from the re-use of one slide several times in a sequence to the use of several slides at once. Several slides can be pulled together or built up.

2. Dash pot adjustments which permit a range of dissolves from super slow to sudden bursts of color.

3. Front overlays or silk screening to present a company logo, or similar design, with changing background or to show a map or a chart with small elements changing.

4. Alpha numeric and segment images in which several digitizing screens are employed to spell words or show numbers using individual letter slides or stacks of segment slides.

5. Solid color slides employed to change letter background.

6. Graded color slides, for example where a pale blue slide might dissolve away to another slide with a tinge of pink that turns toward orange and then falls away to deep purple.

7. Animations in which the sequencing of a few frames make a figure jump around.

8. Aperture slides to narrow the aperture for a graded rainbor slide or a one slide animation.

9. Master slides, for example a chart frame or dark foreground for a sunset.

10. Keyed slides with images which fit together to cover the screen so that any part can be changed without affecting the others or parts can be changed at different rates.

The digitizing screen invention has a wide variety of uses. The digital screen apertures or cells 22 may be of any size or shape. The character, usefulness or possibility of any particular application may depend upon the choice of the most appropriate cell configuration. Some additional possible applications for the digital screen invention are: exhibits including trade shows and show rooms; displays including window displays and point of purchase displays; amusements; toys, including simulations of computer displays; games including digital screen playing surfaces; arcade games; crafts including the making of mosaic drawings from continuous tone originals and for making needlepoint patterns; counting and analysis; billboards; signs, including identification, advertising and traffic control signs; flat screen, high brightness television; interior signage particularly including stores, nightclubs and restaurants; stage settings; store fronts, etc.

In addition to the foregoing embodiments, there are other configurations that are possible within the general digital screen teaching of this invention. Those concepts include:

1. A soft digiscreen in which the front diffuser does not contact the grid or the grid is eliminated (as previously stated) so that the image appears to be air painted.

2. A detailed image screen in which the image storage is similar to that described herein, but in which the art work is made by compressed images which are expanded either by fiberoptic lenses or element by element projection onto the face of the digital screen.

3. A very small grid digital screen (VSG) in which a very small grid enhances the detail and grain of the image.

Other variations are also possible.

While the invention has been described with reference to the preferred embodiment thereof it will be appreciated by those of ordinary skill in the art that changes can be made to the structure and methods disclosed without departing from the spirit and scope of the invention.

I claim:

1. A digital screen display apparatus for illumination by a light source comprising:
   a front diffuser means;
   a back diffuser means for illumination by said light source and separated from said front diffuser means by a predetermined gap;
   grid means located between said back and front diffuser means;
   mask means for blocking out light from said light source at regular intervals, said mask means being located between said light source and said back diffuser means;
   storage means for storing visual information, said storage means locatable between said light source and said mask means, said storage means comprising a partially transparent film means having optical information thereon, said partially transparent film means comprising a plurality of slides each having visual information thereon;
   upper and lower tab means attached to said slides; and,
   drive means for moving said slides with respect to said back diffuser means, said drive means comprising ribbon means for connection to said tab means, lever means connected to said ribbon means, and a solenoid connected to said lever means,
   wherein actuation of said solenoid moves said lever means and said ribbon means thereby causing said slide means to translate with respect to said back diffuser means.

2. The apparatus of claim 1 wherein said drive means further comprises:
   damper means for dampening the movement of said lever means.

3. The apparatus of claim 2 wherein said lever means comprises a "T" shaped crank having a first, second and third arm, and wherein said solenoid is connected to said first arm, said damper means is connected to said second arm and said ribbon means are connected to said third arm.

4. The apparatus of claim 3 wherein said drive means further includes:
   a spring return means connected to said T-shaped lever means to return said T-shaped lever means to a rest position.

5. The apparatus of claim 4 wherein said slide means include holes therein to allow light to pass therethrough unimpeded by said transparent film.

6. The apparatus of claim 5 wherein said mask means comprises a plate having a plurality of transparent and non-transparent stripes running in parallel across the face thereof.

7. The apparatus of claim 6 wherein said grid means comprises a plurality of square shaped apertures having parabolically shaped sidewalls.

8. The apparatus of claim 7 wherein said slide means comprises:
a first set of slide means having a first rest position; and,
a second set of slide means having a second rest position which is normally spaced from said first rest position,
wherein said slide means in said first set are separated from the slide means in said second set.

9. The apparatus of claim 1 wherein said drive means comprises:
a bi-metallic drive means.

10. A digital screen display apparatus comprising:
a front diffuser means;
a back diffuser means;
a spacing means for separating said front diffuser means and said back diffuser means by a predetermined space;
illumination means for projecting light onto said back diffuser means;
mask means located adjacent to said back diffuser means for blocking at least some of the light from said illumination means;
a substantially flat storage means for storing visual information, said storage means comprising a plurality of partially transparent planar means each having visual information thereon;
drive means for driving said storage means with respect to said back diffuser means, said drive means comprising a ribbon means attached to said transparent means, lever means attached to said ribbon means, and solenoid means attached to said lever means,
wherein actuation of said solenoid means causes said partially transparent planar means to translate.

11. A drive apparatus for a digital screen display device including a digitizing screen, partially transparent slide means and an illumination means, said drive apparatus comprising:
flexible connecting means attached to said transparent slide means;
cam means comprising at least one cam having a substantially diamond-shaped profile;
cammable means attached to said flexible connecting means, said cammable means comprising at least a first drivable slide means and a stud attached to said first drivable slide means for contacting said cam means; and,
drive means for driving said cam means,
wherein contact between said cam having a substantially diamond-shaped profile and said stud causes said first drivable slide means to reciprocate which in turn causes said transparent slide means to move with respect to said digitizing screen.

12. The apparatus of claim 11 further including:
at least a second drivable slide means having a cammable stud attached thereto, wherein the stud of said second drivable slide is located below said cam path and wherein the stud of said first drivable slide means is located above said cam path.

13. A single slide digital screen display apparatus for illumination by a light source comprising:
a front diffuser means;
a back diffuser means for illumination by said light source and separated from said front diffuser means by a predetermined gap;
grid means located between said front and back diffuser means;
mask means for blocking out light from said light source at regular intervals, said mask means being located between said light source and said back diffuser means;
storage means comprising a partially transparent film having optical information thereon located between said mask means and said light source; and,
drive means for moving said storage means with respect to said back diffuser means, said drive means including an X drive means for driving said storage means in one given direction, and, a Y drive means for driving said storage means in another given direction different from said X direction.

14. The apparatus of claim 13 wherein said mask means includes a plurality of small apertures therein located at regular intervals with respect to each other and wherein said small apertures comprise less than 25% of the total surface area of said mask means.

15. A digital screen display apparatus for illumination by a light source, said apparatus comprising:
a front diffuser means;
a back diffuser means for receiving light from said light source before said front diffuser means, said back diffuser means being separated from said front diffuser means; and,
a grid means located between said front and back diffuser means, said grid means being of sufficient depth to cause substantial homogenization of light from said back diffuser means thereby producing a digitizing effect on the image as seen from in front of said front diffuser means.

16. A display apparatus for illumination by a light source comprising:
a front diffuser means;
a back diffuser means for illumination by said light source and separated from said front diffuser means by a predetermined gap; and,
storage means for storing visual information, said storage means located between said light source and said back diffuser means, said storage means including one element having visual information thereon stored in segments,
wherein said front diffuser means and said back diffuser means expand said segments to form an apparently continuous image.

17. A digital screen display apparatus for illumination by a light source comprising:
a front diffuser means;
a back diffuser means for illumination by said light source and separated from said front diffuser means by a predetermined gap;
mask means for blocking out light from said light source at regular intervals, said mask means being located between said light source and said back diffuser means; and,
storage means for storing visual information, said storage means located between said mask means and said light source, said storage means comprising at least one partially transparent film having optical information thereon.

18. A digital screen display apparatus for illumination by a light source comprising:
- a front diffuser means;
- a back diffuser means for illumination by said light source and separated from said front diffuser means by a predetermined gap;
- mask means for blocking out light from said light source at regular intervals, said mask means being located between said light source and said back diffuser means;
- storage means for storing visual information, said storage means located between said mask means and said light source, said storage means comprising a plurality of partially transparent film means having optical information thereon; and,
- drive means for driving alternate, partially transparent film means from different storage positions in opposite directions in order to maintain the average illumination of said front diffuser means during the changing of partially transparent film means.

19. A digital screen display apparatus for illumination by a light source comprising:
- a front diffuser means;
- a back diffuser means for illumination by said light source and separated from said front diffuser means by a predetermined gap;
- mask means for blocking out light from said light source at regular intervals, said mask means being located between said back diffuser means and said light source; and,
- light concentrator means comprising elements having internally mirrored walls for concentrating light from said light source on said back diffuser means, said concentrator means being located between a storage means for storing visual information and said light source, said concentrator means also including a tapered profile such that said concentrator means is widest closest to said light source and narrowest closer to to said mask means; and,
- wherein said storage means is located between said concentrator means and said mask means and comprises at least one partially transparent film having optical information thereon.

20. A digital screen display apparatus for illumination by a light source comprising:
- a front diffuser means;
- a back diffuser means for illumination by said light source and separated from said front diffuser means by a predetermined gap;
- mask means for blocking out light from said light source at regular intervals, said mask means being located between said back diffuser means and said light source;
- storage means for storing visual information, said storage means locatable between said light source and said mask means, said storage means comprising a plurality of substantially stiff slides each having visual information thereon, said substantially stiff slides including upper and lower tab means thereon;
- drive means connected to said upper and lower tap means for selectively moving said slides with respect to said mask means,
- wherein said slides are sufficiently stiff so that tension exerted on said upper and lower tab means guides individual slides so that individual slides move as a unit.

21. A screen display apparatus comprising:
- a front diffuser means;
- a back diffuser means separated from said front diffuser means by a predetermined gap;
- imaging means for illuminating said back diffuser means, said imaging means comprising an array of controllable elements.

22. A digital screen display apparatus for illumination by a light source comprising:
- a front diffuser means;
- a back diffuser means for illumination by said light source and separated from said front diffuser means by a predetermined gap;
- mask means for blocking out light from said light source at regular intervals, said mask means being located between said light source and said back diffuser means;
- storage means for storing visual information, said storage means locatable between said light source and said mask means, said storage means comprising a plurality of film means having optical information thereon and in which each of said film means includes a plurality of substantially transparent section means therein.

23. The apparatus of claim 22 wherein said substantially transparent section means comprises rows of punched out areas of transmitting substantially all the light that falls on said section means therethrough.

24. A digital screen display apparatus for illumination by a light source comprising:
- a front diffuser means;
- a back diffuser means for illumination by said light source and separated from said front diffuser means by a predetermined gap;
- mask means for blocking out light from said light source at regular intervals, said mask means being located between said light source and said back diffuser means;
- storage means comprising a plurality of partially transparent film means having optical information thereon;
- drive means for moving said plurality of partially transparent film means with respect to said back diffuser means; and,
- continuous tension means for connecting said drive means to said transparent film means,
- wherein said constant tension means permits said drive means to drive said transparent film means up and down.

25. The apparatus of claim 24 wherein said drive means comprises a plurality of individual drive means associated respectively with each individual transparent film means for selectively driving said individual transparent film means.

26. A digital screen display apparatus for illumination by a light source, said apparatus comprising:
- a front diffuser means;
- a back diffuser means for receiving light from said light source before said front diffuser means, said back diffuser means being separated from said front diffuser means; and,
- a grid means located between said front and back diffuser means, said grid means being of sufficient depth to cause substantial homogenization of light from said back diffuser means thereby producing a digitizing effect on the image as seen from in front of said front diffuser means, said grid means including a plurality of cells having reflective sidewalls, wherein the reflectivity of said sidewalls further enhances the homogenization of light passing from said back diffuser means to said front diffuser means and the efficiency of the apparatus in passing light.

27. A digital screen display apparatus for illumination by a light source, said apparatus comprising:
- a front diffuser means;
- a back diffuser means for receiving light from said light source before said front diffuser means, said back diffuser means being separated from said front diffuser means; and,
- a grid means located between said front diffuser means and said back diffuser means, said grid means being of sufficient depth to cause substantial homogenization of light from said back diffuser means thereby producing a digitizing effect on the image as seen from in front of said front diffuser means, said grid means including a plurality of cells having tapered sidewalls such that the opening in said cells is larger closer to said front diffuser means and smaller closer to said back diffuser means,
- wherein the tapering of said sidewalls urges light toward said front diffuser means thereby enhancing the efficiency of the apparatus in passing light.

28. A screen display apparatus comprising:
- a front diffuser means;
- a back diffuser means separated from said front diffuser means by a predetermined gap; and,
- imaging means for illuminating said back diffuser means, said imaging means comprising an array of controllable elements including a plurality of liquid crystal elements.

29. A screen display apparatus comprising:
- a front diffuser means;
- a back diffuser means separated from said front diffuser means by a predetermined gap; and,
- imaging means for illuminating said back diffuser means, said imaging means comprising an array of controllable elements including a plurality of fiber-optic elements.

30. A drive apparatus for a digital screen display device including a digitizing screen, partially transparent slide means and an illumination means, said drive apparatus comprising:
- flexible connecting means attached to said transparent slide means;
- bi-metallic means attached to said flexible connecting means;
- heating means for heating said bi-metallic means to cause said bi-metallic means to move said slide means; and,
- spring return means attached to said transparent slide means to return said transparent slide means to a rest position,
- wherein actuation of said heating means causes said bi-metallic means to move said slide means with respect to said digitizing screen and wherein non-actuation of the bi-metallic means causes said spring means to return said slide means to its rest position.

* * * * *